United States Patent
Pair et al.

(10) Patent No.: US 7,640,101 B2
(45) Date of Patent: Dec. 29, 2009

(54) METHOD AND APPARATUS FOR MOTION-BASED DISABLING OF ELECTRONIC DEVICES

(75) Inventors: Craig Pair, Central City, AR (US); Michael Kaelin, Fort Smith, AR (US)

(73) Assignee: Control Technologies, Inc., Fort Smith, AR (US)

( * ) Notice: Subject to any disclaimer, the term of this patent is extended or adjusted under 35 U.S.C. 154(b) by 772 days.

(21) Appl. No.: 10/875,918

(22) Filed: Jun. 24, 2004

(65) Prior Publication Data
US 2005/0288860 A1    Dec. 29, 2005

(51) Int. Cl.
*G01C 21/26* (2006.01)
(52) U.S. Cl. .................... 701/213; 701/36; 342/357.06
(58) Field of Classification Search ......... 701/207–209, 701/213, 21, 36; 340/989–993; 342/257.01–357.12; 455/456.1–456.6
See application file for complete search history.

(56) References Cited

U.S. PATENT DOCUMENTS

| | | | |
|---|---|---|---|
| 5,032,828 A | 7/1991 | Hirose et al. | |
| 5,148,153 A | 9/1992 | Haymond | |
| 5,404,443 A | 4/1995 | Hirata | |
| 5,541,572 A | 7/1996 | Okamoto et al. | |
| 5,949,345 A | 9/1999 | Beckert et al. | |
| 6,122,682 A | 9/2000 | Andrews | |
| 6,574,531 B2 | 6/2003 | Tan et al. | |
| 6,690,940 B1 | 2/2004 | Brown et al. | |
| 7,050,907 B1* | 5/2006 | Janky et al. ................. | 701/213 |
| 7,336,227 B2* | 2/2008 | Durst et al. ............ | 342/357.09 |

* cited by examiner

*Primary Examiner*—Richard M. Camby
(74) *Attorney, Agent, or Firm*—Baker & Daniels LLP

(57) ABSTRACT

The system of the present invention uses a gps receiver and a computer program product to disable a feature of an electronic device when movement of the receiver is detected. Speed data from a gps data stream is monitored. When the speed of the gps receiver exceeds a predetermined value, the desired feature of the electronic device is disabled. For example, when the speed of the gps receiver exceeds 0.5 knots, a windows function call is executed to set a desired display element as a top window on a display screen. The system may allow for temporary enabling of disabled features and for rapid enabling of disabled features when motion stops. The system may also include navigational software. A manufacturer may also use a proprietary combination of one or more disabled data fields in a gps data stream to identify gps receivers approved for use with the system.

43 Claims, 2 Drawing Sheets

METHOD AND APPARATUS FOR MOTION-BASED DISABLING OF ELECTRONIC DEVICES

BACKGROUND OF THE INVENTION

This invention relates to motion-based disabling of electronic devices and, more particularly, to the disabling of distracting features of electronic devices in a vehicle while the vehicle is moving.

It is sometimes desirable to disable features of an electronic device while the electronic device is in motion. For example, it can be distracting and dangerous for a driver to view a display screen of a laptop computer or similar device while the driver is operating a moving vehicle. It is known to fully or partially disable a display screen of a laptop or other electronic device in a vehicle while the vehicle is in motion. Examples of such safety systems are disclosed in references such as U.S. Pat. Nos. 6,690,940 (Brown et al.), 6,574,531 (Tan et al.), 6,122,682 (Andrews), 5,949,345 (Beckert et al.), 5,541,572 (Okamoto et al.), 5,404,443 (Hiratato), 5,148,153 (Haymond), 5,032,828 (Hirose et al.). The disclosures of these patents are incorporated herein by reference. The systems disclosed in these patents offer a number of advantages but are not without problems. For example, the methods disclosed in such references for determining whether a driver is operating a vehicle are generally needlessly cumbersome, expensive, and time-consuming. The disclosed systems typically call for extra equipment and complex and time-consuming installation. The disclosed systems are also typically difficult to move from one vehicle to another. The systems typically require the use of sensors that must be installed or associated with axles, wheels, speedometers, parking brakes, transmissions, drive trains, or other components of the vehicles. This means that these systems typically require specialized installation work to be performed on a vehicle to prepare the vehicle for the system. This also makes it difficult or time consuming to prepare a vehicle for use with the system. Systems relying upon these types of sensors may suffer from a number of other disadvantages such as undesirable wear and tear of mechanical systems and difficulty in maintaining, upgrading, repairing, and replacing such systems.

It is also sometimes desirable to provide a vehicle with a portable or onboard navigational system. Navigational systems typically include a computer, mapping or navigational software, and a Global Positioning System ("gps") receiver. The gps receiver communicates with gps satellites and provides a data stream, typically including a number of data fields, to the computer.

Mapping or navigational software converts the data to a user friendly format for display on the screen, often showing the location of the gps receiver and vehicle on a map. Some vehicles are equipped with onboard navigational systems. Kits are also available that enable a laptop computer, personal digital assistant ("pda"), or similar electronic device to be used as navigational system that is very easy to move from vehicle to vehicle. Such kits typically include a portable gps receiver and navigational software. The gps receiver may be operably connected to an electronic device in any number of different ways. For example, the gps receiver may have a USB or serial plug 24, may include a compact flash card that fits in a card slot, typically with the help of a PCMCIA adapter, or may include wireless capabilities for a wireless connection. These mapping or navigational systems and kits also offer a number of advantages but are not without problems. For example, it can be distracting and dangerous for a driver to view a display screen of a mapping or navigational system while the driver is operating a moving vehicle. In fact, U.S. Pat. Nos. 6,574,531 (Tan et al.) and 6,266,589 (Boies et al.) both disclose the use their systems for disabling at least some of the functionality of gps systems in moving vehicles for safety reasons.

SUMMARY OF THE INVENTION

It is therefore an object of the present invention to provide an improved method and apparatus for motion-based disabling of one or more features of an electronic device.

It is a further object of the present invention to provide a method and apparatus for monitoring data from a gps receiver for detecting motion and disabling one or more features of an electronic device when motion is detected.

It is a still further object of the present invention to provide a system that uses speed data from a gps receiver data stream for detecting motion and disabling one or more features of an electronic device when motion is detected.

It is a still further object of the present invention to provide a method and apparatus for motion-based disabling of one or more features of an electronic device that may be used in a vehicle without requiring modifications to the vehicle.

It is a still further object of the present invention to provide a method and apparatus for motion-based disabling of one or more features of an electronic device that may be quickly and easily moved from one vehicle to another without requiring modifications to a vehicle.

It is a still further object of the present invention to provide a method and apparatus for motion-based disabling of one or more features of an electronic device that does not require the monitoring of a vehicle's axles, wheels, speedometers, parking brakes, transmissions, drive trains, or other components.

It is a still further object of the present invention to provide a method and apparatus of the above type that obscures data on a display screen when a speed exceeds a predetermined value.

It is a still further object of the present invention to provide a method and apparatus of the above type that obscures data on a display screen when movement of a gps receiver is detected.

It is a still further object of the present invention to provide a method and apparatus of the above type that sets a desired display element as a top window on a display screen of an electronic device when motion is detected.

It is a still further object of the present invention to provide a method and apparatus of the above type that allows a manufacturer to use a proprietary combination of one or more disabled data fields in a gps data stream to identify gps receivers approved for use with the system.

It is a still further object of the present invention to provide a method and apparatus of the above type that allows for quick and easy temporary enabling of a disabled feature.

It is a still further object of the present invention to provide a method and apparatus of the above type that allows for quick and easy enabling of a disabled feature when motion ceases.

It is a still further object of the present invention to provide a method and apparatus of the above type that does not require redundant or additional equipment or vehicle modifications to provide motion-based disabling of an electronic device already having a navigational or mapping system.

It is a still further object of the present invention to provide a method and apparatus of the above type that makes use of a readily available gps receiver to provide motion-based disabling of an electronic device.

Toward the fulfillment of these and other objects and advantages, the system of the present invention uses a gps receiver and a computer program product to disable a feature of an electronic device when movement of the receiver is detected. Speed data from a gps data stream is monitored. When the speed of the gps receiver exceeds a predetermined value, the desired feature of the electronic device is disabled. For example, when the speed of the gps receiver exceeds 0.5 knots, a windows function call is executed to set a desired display element as a top window on a display screen. The system may allow for temporary enabling of disabled features and for rapid enabling of disabled features when motion stops. The system may also include navigational software. A manufacturer may also use a proprietary combination of one or more disabled data fields in a gps data stream to identify gps receivers approved for use with the system.

BRIEF DESCRIPTION OF THE DRAWINGS

The above brief description, as well as further objects, features and advantages of the present invention will be more fully appreciated by reference to the following detailed description of the presently preferred but nonetheless illustrative embodiments in accordance with the present invention when taken in conjunction with the accompanying drawings, wherein.

DETAILED DESCRIPTION OF THE PREFERRED EMBODIMENT

Figure 1:
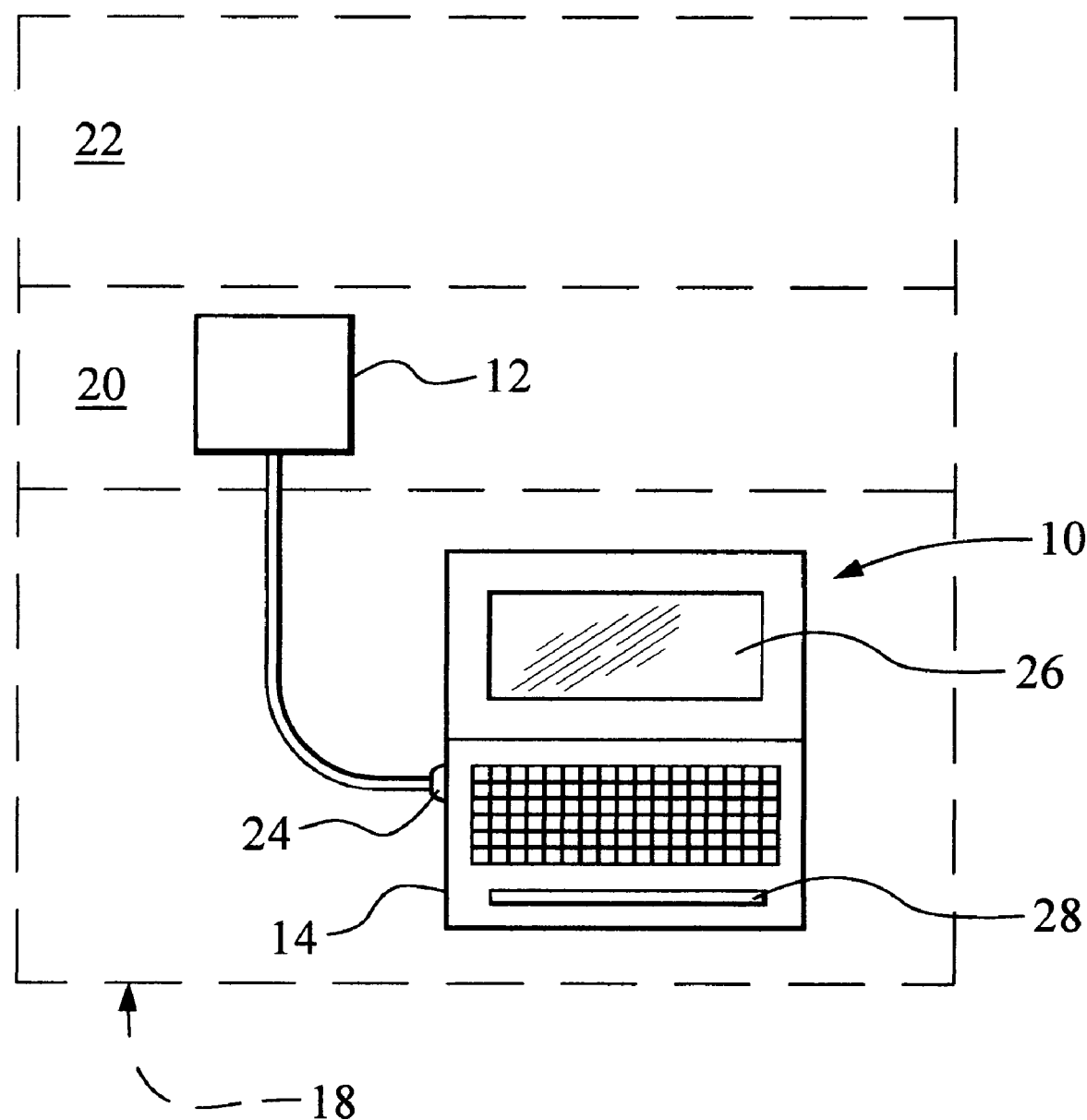
FIG. 1 is a schematic very of a system for practicing the present invention.

Referring to FIG. 1, the reference numeral 10 refers in general to a system of the present invention. The system 10 includes a gps receiver 12, an electronic device 14, and a computer program product 16. The system 10 will typically be employed in a vehicle 18 having a dashboard 20 and a windshield 22.

The system 10 may find many uses but is particularly useful for an employer with a fleet of vehicles, such as a utility company having a fleet of trucks. Computers, particularly laptop computers, are often used to link a home office with utility truck or service vehicle drivers. A company will typically want to maintain information flow that is unimpaired but will also want to avoid the downside of distracting a driver while the driver is operating a vehicle 18. The present system 10 provides companies and their employees a way to remove in-cab visual distractions and to decrease the chances that using a laptop in a company vehicle 18 will impair attentive driving. Using the system 10 as part of a company's laptop communications device increases employee productivity, keeps the company driver, pedestrians, and other motorists safer in traffic and on the open road, and reduces a company's liability costs associated with traffic accidents.

The integration of laptop computers with fleet vehicles provides increased production and control of a mobile workforce. However, as is usually the case with technological advances, they require behavioral and operational changes for those who use the technology. Proactive companies can take two types of measures to maintain productivity gains that laptop computers provide while lessening driver distraction and providing a safe interaction with the public: passive and active. Passive measures include adopting and publishing company policies, such as a policy that prohibits the use of certain devices whenever a vehicle 18 is in motion or a policy that requires the distracting items be kept out of the reach or vision of the driver. An active approach might be to automatically disable the laptop whenever the vehicle 18 is in motion. The present system 10 is a useful part of an active approach. Using the present system 10 decreases the chances that a driver will be distracted by data appearing on a display screen of a laptop. Using the present system 10 also serves as a reminder to employees that safety is first on the mind of the company and should remain first on their minds as well.

Turning to the present system 10, the gps receiver 12 may take any number of forms. For example, it may be in the form of a standalone, external device, it may be installed internally in the electronic device 14, or it may be installed in the vehicle 18. It may be operably connected to the electronic device 14 or devices so that it communicates with the electronic device 14 or devices in any number of ways. For example, the gps receiver 12 may have a USB or serial plug 24, may include a compact flash card that fits in a card slot, typically with the help of a PCMCIA adapter, or may include wireless capabilities for a wireless connection. The gps receiver 12 is capable of generating a data stream. A computer program in the gps receiver 12 or in the electronic device 14 organizes the data in the data stream into data fields that are preferably comma separated fields. The computer program for accomplishing this will typically be a separate program that accompanies the gps receiver 12 but may be integrated with and form part of the computer program for practicing the present invention. A few of the data fields may include: time of fix, navigation receiver warning, latitude, longitude, speed over ground, course made good. UTC date of fix, magnetic variation, and a mandatory checksum. Sample comma separated data fields may appear as follows:

(example 1): $GPRMC,081836,A,3751.65,S,14507.36,E, 000.0,360.0,130998,011.3,E*62

(example 2): $GPRMC,225446,A,4916.45,N,12311.12,W, 000.5,054.7,191194,020.3,E*68

The data in the data fields set forth in example 2 provides the following information:

| | |
|---|---|
| 225446 | Time of fix 22:54:46 UTC |
| A | Navigation receiver warning A = Valid position, V = Warning |
| 4916.45, N | Latitude 49 deg. 16.45 min. North |
| 12311.12, W | Longitude 123 deg. 11.12 min. West |
| 000.5 | Speed over ground, Knots |
| 054.7 | Course Made Good, degrees true |
| 191194 | UTC Date of fix, 19 Nov. 1994 |
| 020.3, E | Magnetic variation, 20.3 deg. East |
| *68 | mandatory checksum |

For quality control, compatibility, and other purposes, it may be desirable to restrict a system 10 to the use of only approved gps receivers. There is a fair amount of uniformity in the formatting, data fields, and data streams used and generated by different gps receivers. User applications may not require all of the data from all of the data fields. For example, the present system 10 preferably uses only the speed over ground field. Of course any number of different fields may be used to detect movement of the gps receiver 12. One way of restricting a system 10 to the use of only approved gps receivers would be to disable a proprietary combination of unneeded data fields so that the gps receiver 12 does not provide data in the selected data fields. Software is readily available for disabling one or more data fields so that the gps receiver 12 does not transmit data in the disabled data fields.

The computer program product 16 may monitor the data stream to determine whether the appropriate combination of data fields has been disabled and may include instructions that render the system 10 operable only if the appropriate combination of data fields has been disabled. For example, if a user attempted to use a non-approved, off-the-shelf gps receiver 12 that transmits data in all data fields, the computer program product 16 would detect that the data stream from the non-approved gps receiver 12 included data in one or more fields in which there should be no data. Upon detecting the presence of data in a data field in which there should be no data, the computer program product 16 would not execute steps to disable the electronic device 14. Any number and combination of data fields may be disabled depending upon the data fields that will be needed by the desired user applications. It is of course understood that no data fields need to be disabled and that any number of other ways may be used to limit operation of the system 10 to approved gps receivers or other components.

The electronic device 14 may take any number of different forms. For example, it may be a laptop computer, an onboard computer, a mobile telephone, a pda, or any number of similar devices. It may be a standalone device or may be installed internally in a vehicle 18 or other mobile device. It may be operably connected to and communicate with the gps receiver 12 in any number of ways as discussed above. In the preferred embodiment, the electronic device 14 is a laptop computer having a display screen 26.

The computer program product 16 may take any number of different forms and approaches and may be stored in any number of different manners and locations. The computer program is stored on a program storage device such as a floppy disk, CD, DVD, hard drive, flash drive, or any number of different electronic storage media. In the preferred embodiment, the program will be stored on a hard drive of the laptop computer 14. In kit form, the program will typically be stored on a CD-ROM for installation to the hard drive of the computer. It is of course understood that the program may be stored, distributed, and used in any number of different ways. For example, the program may be stored on a server or other computer hard drive for downloading over the Internet or for downloading in any number of different known manners.

Although the present invention is discussed primarily in the context of use in an automobile, it is understood that the present invention may find different uses. For example the present invention may be used in any number of different vehicles, including but not limited to automobiles, aircraft, watercraft, trains, and motorcycles, and may be used in any number of different mobile devices and machines in which it may be desirable to temporarily disable or enable a feature of an electronic device 14 during movement.

The system 10 may be best understood by first describing how one preferred embodiment of a system of the present invention may be used, including such things as desired features and functionality of the system. Afterward, one method of providing the desired features and functionality will be described. It is of course understood that there will be any number of ways of providing the desired features and functionality. In operation, the computer program is loaded onto the hard drive of a laptop computer 14. During installation, the gps receiver 12 is plugged into a USB port of the laptop computer 14 and the appropriate corn port is detected for communicating with the gps receiver 12. The laptop computer 14 and gps receiver 12 are placed in a vehicle 18, and the gps receiver 12 is operably connected to the laptop computer 14 so that it may transmit a data stream to the laptop computer 14. Movement of the vehicle 18 should cause movement of the gps receiver 12, so detecting movement of the gps receiver 12 is a good way for determining whether the vehicle 18 is moving. False triggering may occur if the gps receiver 12 is moved while the vehicle 18 is not in motion, so it is preferred to removably affix the gps receiver 12 to a dashboard 20, such as by using hook and loop type fasteners. As mentioned earlier, it may be desirable to restrict the system 10 to the use of only approved gps receivers. If so, the computer program will monitor the data stream received from the gps receiver 12 to determine whether the appropriate combination of data fields has been disabled and will include instructions that render the system 10 operable only if the appropriate combination of data fields has been disabled.

When motion of the gps receiver 12 is detected, data on the display screen 26 of the laptop computer 14 is disabled so that data on the screen is obscured. This may be accomplished in any number of ways, such as by clearing the screen or setting a desired display element as a top window on the display screen 26. The desired display element may take any number of different forms, such as an image emulating a blank screen, a display element emulating a screen saver, or a display element having any other desired static or moving graphic elements. The screen remains disabled until motion of the gps receiver 12 stops, an override or enabling command is received, or the laptop quits receiving required data from the gps receiver 12. If no override or enabling command is received and there is no interruption in data, after a desired delay period from when motion of the gps receiver 12 stops, the display screen 26 is enabled, such as by setting the display element so that it is no longer the top window on the display screen 26. The display screen 26 could be enabled immediately when motion of the gps receiver 12 stopped, but it is preferred to have a delay of approximately 30 seconds so that the desired screen element will not rapidly appear and disappear under stop and go driving conditions. The length of the delay is easily set, and a "settings" screen preferably allows a user to adjust the length of the delay as desired. It will typically be desirable to set a delay that is sufficiently long so that the desired screen element remains as the top window when a driver stops briefly at a stop sign, stops briefly to change directions, or is stopped briefly in stop and go traffic.

Building in a delay overcomes the problem of the desired screen element rapidly appearing and disappearing under stop and go driving conditions, but the delay can also frustrate a driver, who will often want immediate access to information from the laptop when he or she stops the vehicle 18. To overcome one problem without creating a new one, an override or enabling command is available to immediately enable a display screen 26 after the vehicle 18 stops but before the built in delay period passes. In the preferred embodiment, the driver provides an override command by striking the space bar 28. If the driver strikes the space bar 28 while the gps receiver 12 is not in motion, the display screen 26 is immediately enabled. The screen will remain enabled, until motion of the gps receiver 12 is again detected.

An override or enabling command is also available in case a driver needs to quickly access information from the laptop while the vehicle 18 is in motion. For example, a driver may need to take a quick look at a map that forms part of a navigational system or may need to acknowledge receipt of an urgent message. In the preferred embodiment, the driver provides an override command by striking the space bar 28. If the driver strikes the space bar 28 while the vehicle 18 is in motion, the program enables the display screen 26 for a short period of time, such as about 15 seconds, and then disables the screen again, such as by setting the blank screen as the top window. The length of time that the screen is temporarily enabled is easily set, and a "settings" screen preferably allows a user to adjust the length of time as desired. It is preferred that the same override command be used regardless of whether or not the gps receiver 12 is in motion, but it is understood that different commands may be used for these different conditions.

If the laptop ceases to receive data from the gps receiver 12 or receives invalid data from the gps receiver, it is preferred to enable the display screen 26. A warning screen may also be used to advise the user of a problem. The default setting will typically be an enabled display screen 26. It is understood that, under some conditions, it might be desirable to make the default setting a disabled screen. For example, providing the present system 10 in a vehicle 18 is in some ways similar to providing a seat belt in the vehicle 18. An employer may encourage employees to wear a seat belt and may have a policy requiring employees to wear a seat belt, but forcing an employee to use a seat belt at all times can be difficult if the employee does not wish to do so. Likewise, providing the present system 10, encouraging an employee to use it, and having a policy requiring it to be used at all times may still fall short of forcing an employee to use the system 10 at all times if the employee does not wish to do so. The difficulty with which the system 10 may be defeated may be adjusted depending upon the circumstances. For example, the system 10 may be configured so that the display screen 26 will be disabled if the laptop ceases to receive data from the gps receiver 12 or receives invalid data from the gps receiver. This would prevent an employee from defeating the system 10 by unplugging the gps receiver 12 from the laptop. If this configuration is used, it is preferred to provide for an override or enabling command and is more preferred to provide a password protected override or enabling command. A less drastic measure might be for the program to generate a log or report if the laptop 14 ceases to receive data from the gps receiver 12 or receives invalid data from the gps receiver. The log or report could be used to monitor compliance with company rules or policies.

Figure 2:
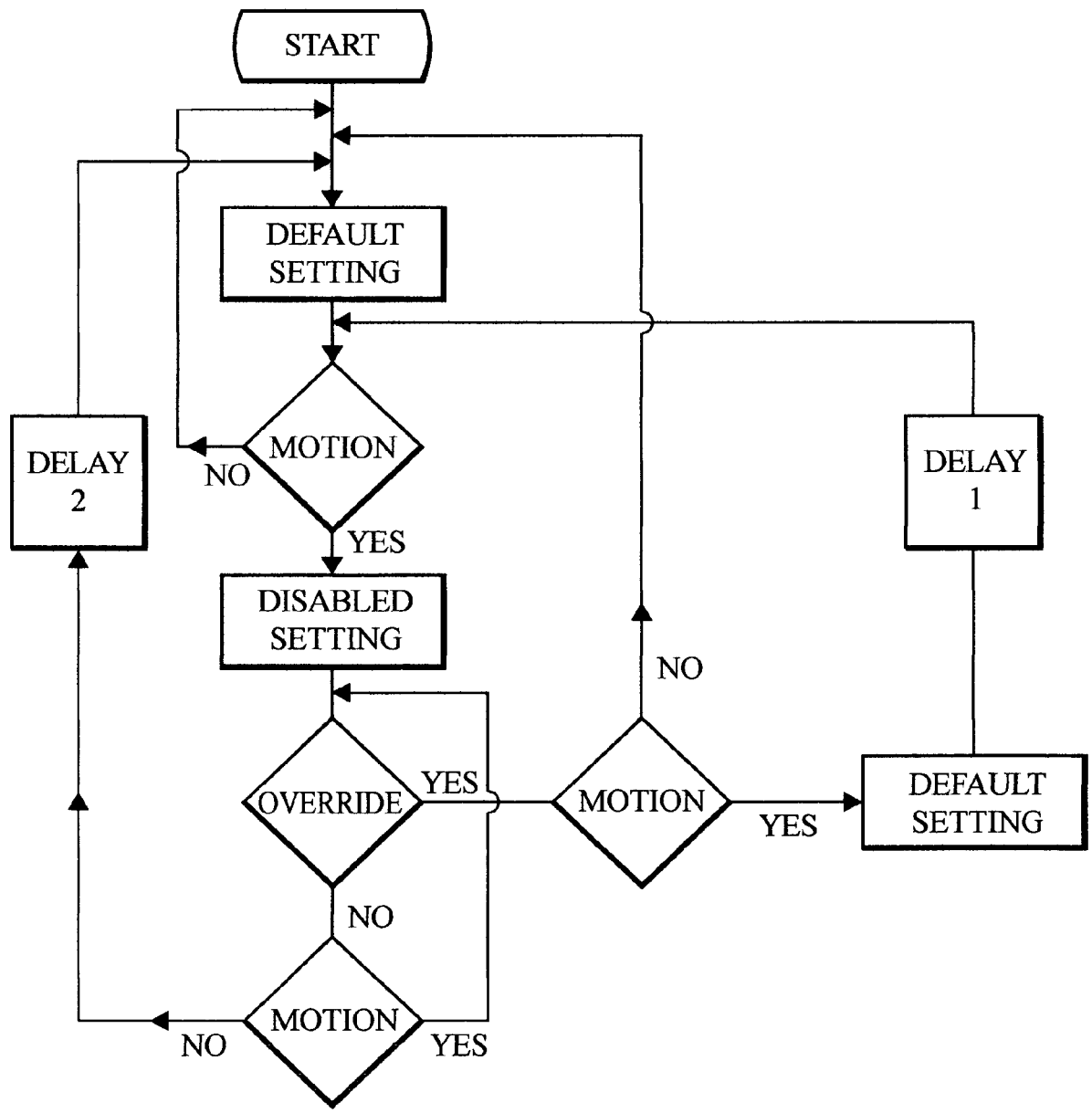
FIG. 2 is a flow chart illustrating one method of practicing the present invention.

Having in mind the desired features and functionality described above, the following will discuss one method of providing the desired features and functionality. It is understood that any number of different ways may be used to reach the desired result. Referring to FIG. 2, when the laptop is turned on, the process is started. The computer program is loaded, and a desired graphics element, such as a screen emulating a screen saver, is loaded to run unseen in the background. This is the default setting. It is preferred but not necessary to load the program when the computer is turned on. The program may be loaded as needed, much like a computer user might load a spreadsheet or word processing program only when needed.

The gps receiver 12 transmits a data stream to the laptop computer 14, and the computer parses the data stream to read data from a speed over ground data field to detect movement of the gps receiver 12. The system 10 may be configured so that motion is detected in any number of ways. For example, the program may monitor data from the speed over ground and may disable one or more features of the electronic device 14 only when the speed data indicates a speed that exceeds a predetermined value. For example, the program may disable the feature of the electronic device 14 when the speed data indicates a speed that exceeds 0 knots. To help avoid false triggering, the predetermined value may be set at a number that is greater than 0 knots. For example, the predetermined value is preferably set so that it is less than or equal to approximately 1 knot per second, and is more preferably set so that it is less than or equal to approximately 0.5 knots. Any number of different ways may be used for avoiding false triggering. For example, the program may require that a non-zero speed be detected for a minimum period of time or for a minimum number of consecutive readings, such as for at least approximately 5 seconds or for at least approximately 3 seconds. The idea is to create a buffering method to avoid disabling a feature of the electronic device 14 when temporary motion of the gps receiver 12 occurs that is unrelated to operation of the vehicle 18. For example, the gps receiver 12 may give a momentary non-zero speed reading if it is inadvertently bumped, shifted, or moved while a vehicle 18 is not being operated. Likewise, the gps receiver 12 might give a momentary non-zero reading in response to any number of factors related to signal transmission and processing of the gps satellite system, even when a vehicle 18 is not moving. The system 10 allows great flexibility in deciding the types and duration of readings that will lead to disabling of a feature of a connected electronic device 14. It is of course understood that data from data fields other than the speed over ground field may be used and that data from more than one data field may be used for determining when to disable a feature of an electronic device 14. For example, data streams may be monitored for changes in latitude and longitude, for changes in direction, for changes in acceleration, or for any other data that might tend to indicate motion of the gps receiver 12, and therefore motion of the vehicle 18 in which the gps receiver 12 is located. Any combination of fields may be monitored to increase accuracy and reduce false triggering. For example, the program may monitor speed, latitude, and longitude and may disable the feature only in response to a combination of both a non-zero speed reading and either a change in latitude or longitude.

In addition to monitoring data in the data stream for an indication of motion, the computer program may also monitor data, or the absence of data from selected data fields, to determine whether the gps receiver 12 being used is an authorized gps receiver. If the program detects that the gps receiver 12 is providing data in data fields in which there should be no data, the program may maintain the default setting and may avoid disabling a feature of the electronic device 14. If the program detects motion and detects that data is missing from the correct data field or the correct combination of data fields, the program may execute steps to disable a feature of the electronic device 14. Of course it is understood that this verification step may be performed in any number of different ways and may be omitted entirely.

When motion is detected, the program disables one or more features of the electronic device 14. In one preferred embodiment, when the program detects a speed over ground that exceeds 0.5 knots, the program uses the following windows function call to set a desired graphics element as the "top" window on the desktop of the laptop display: "Call SetWindowPos(frmMain.hwnd, HWND_TOPMOST, 0&, 0&, gDispRec.Right, gDispRec.Bottom. SWP_SHOWWINDOW)". In this manner, the laptop display screen 26 is blacked out, but the laptop 14 otherwise remains fully functional. For example, applications can continue to run, and emails and other communications can still be sent and received. Although the type of disabling performed in the preferred embodiment involves simply blanking or blacking out the display screen 26 of a laptop computer 14, the system 10 allows for great flexibility and may be used in connection with any number of other devices, particularly electronic devices. Similarly, the disabling may be full or partial and may be applied to any number of different features of the electronic device 14 to be disabled. Further, more than one set of rules may be used to enable or disable features of the electronic devices. For example, similar to the system disclosed in U.S. Pat. No. 6,266,589 (Boies et al.), different speed based rules may be used to disable different features at different speeds or under different conditions. Further still, it is understood that the software may take any number of forms and may or may not be used in connection with a windows based operating system.

While the laptop screen 26 is disabled, the program continues to monitor speed data to detect when motion of the gps receiver 12 stops. The program also monitors for an override or enabling command, preferably a keystroke of the space bar 28. The override command may take any number of different forms. It may be a keystroke or combination of keystrokes, a click or combination of clicks of a mouse or other pointer device, or may take any number of other forms. It may be, but preferably is not, password protected. If the override command is detected, the program determines whether the gps receiver 12 is still in motion. If the gps receiver 12 is still in motion, the program immediately enables the display screen 26, such as by removing the desired graphic element from the top window, and adds a time delay of a predetermined length, such as 15 seconds, before the program determines whether it is again appropriate to disable the screen. The length of the delay is easily set, and a "settings" screen preferably allows a user to adjust the delay as desired. Providing this temporary override allows a user to quickly obtain needed information from the electronic device 14 while a vehicle 18 is in motion, such as to get a brief look at a map that forms part of a navigational system. After the delay, the program will again disable the screen 26 if the gps receiver 12 moves. If the gps receiver 12 is not in motion when the override command is received, the program immediately enables the display screen 26 by removing the desired graphic element from the top window and immediately resumes monitoring for motion for determining whether it is appropriate to disable the screen 26. It is of course understood that the same delay used when motion is detected may also be used when motion is not detected.

Other modifications, changes, and substitutions are intended in the foregoing, and in some instances, some features of the invention will be employed without a corresponding use of other features. For example, the system 10 may be used with or without accompanying navigational system software. The gps receiver 12 may be external, internal to the electronic device 14, or internal to the vehicle 18. It is understood that use of the present system 10 is not limited to situations involving the removal of possible distractions. It is also understood that the present system 10 may be used in any number of situations in which it may be desirable to disable or enable a feature or functionality of an electronic device 14 or other machine based upon information that may be provided by a gps receiver 12. It is understood that all measurements and quantitative information are given by way of example only and are not intended to limit the scope of the invention. It is also understood that examples are intended to provide only a few of many possible illustrative samples and are not intending to be exhaustive listings. Accordingly, it is appropriate that the appended claims be construed broadly and in a manner consistent with the scope of the invention.

What is claimed is:

1. A method, comprising the steps of:
   (1) providing data from a gps receiver to an electronic device, said data comprising first data in a speed data field;
   (2) monitoring said data to detect movement of said gps receiver; and
   (3) disabling a feature of said electronic device when said first data in said speed data field indicates movement of said gps receiver at a speed that exceeds a predetermined value and altering a display screen of said electronic device.

2. The method of claim 1, wherein said predetermined value is less than or equal to approximately 1 knot.

3. The method of claim 1, wherein said predetermined value is less than or equal to approximately 0.5 knots.

4. The method of claim 1, wherein step (3) comprises obscuring data on a display screen of said electronic device when movement of said gps receiver exceeds a predetermined value.

5. The method of claim 1, wherein step (3) comprises setting a desired display element as a top window on a display screen of said electronic device when movement of said gps receiver exceeds a predetermined value.

6. The method of claim 1, wherein step (3) comprises executing a windows function call to set a desired display element as a top window on a display screen of said electronic device when movement of said gps receiver exceeds a predetermined value.

7. The method of claim 1, wherein:
   step (2) comprises monitoring said first data in said first data field to detect movement of said gps receiver; and further comprising:
   partially disabling said gps receiver so that said gps receiver does not provide second data in a second data field to said electronic device; and
   detecting whether said gps receiver provides said second data to said electronic device; and wherein step (3) comprises disabling said feature of said electronic device when movement of said gps receiver is detected only if it is also detected that said gps receiver does not provide said second data to said electronic device.

8. The method of claim 1, further comprising:
   after step (3), temporarily enabling said feature of said electronic device for a first selected period of time upon receipt of a temporary enabling command.

9. The method of claim 1, further comprising:
   after step (3), monitoring said first data in said speed data field to detect cessation of movement of said gps receiver; and enabling said feature of said electronic device after a second selected period of time passes from when cessation of movement of said gps receiver is detected.

10. The method of claim 1, further comprising;
    after step (3), monitoring said first data in said speed data field to detect cessation of movement of said gps receiver; and enabling said feature of said electronic device after the sooner of (a) a second selected period of time passes from when cessation of movement of said gps receiver is detected, or (b) cessation of movement of said gps receiver is detected and an enabling command is received.

11. A combination, comprising:
    a machine;
    a computer program product on a computer readable medium comprising at least one program storage device readable by a machine, tangibly embodying a program of instructions executable by the machine to perform method steps, comprising:
    (1) monitoring data received by the machine from a gps receiver to detect movement and speed of said gps receiver; and (2) disabling a feature of said machine when movement of said gps receiver is detected and the speed exceeds a predetermined value.

12. The combination of claim 11, wherein step (2) comprises obscuring data on a display screen of said machine when movement of said gps receiver is detected.

13. The combination of claim 11, further comprising a gps receiver external from and operably connected to said machine.

14. The combination of claim 13, further comprising navigational software.

15. The combination of claim 13, wherein said gps receiver is capable of providing data in a plurality of data fields to said machine, said gps receiver being partially disabled so that said gps receiver does not provide data from a least one of said plurality of data fields to said machine; and
wherein said method steps further comprise:
detecting whether said gps receiver provides said data from said at least one of said plurality of data fields to said machine; and
wherein step (2) comprises disabling said feature of said machine when movement of said gps receiver is detected only if it is also detected that said gps receiver does not provide said data from said at least one of said plurality of data fields to said machine.

16. A combination, comprising:
a vehicle;
a laptop computer in said vehicle;
a gps receiver external from and operably connected to said laptop computer; and
a computer program product on a computer readable medium stored on and readable by said laptop computer, said computer program embodying a program of instructions executable by said laptop computer to perform method steps, comprising:
(1) monitoring speed data received from said gps receiver to detect movement of said gps receiver; and
(2) disabling a feature of said laptop computer when said speed data indicates movement of said gps receiver at a speed that exceeds a predetermined value.

17. The combination of claim 16 wherein step (2) comprises obscuring data on a display screen of said laptop computer when movement of said gps receiver is detected.

18. The combination of claim 16, wherein step (2) comprises executing a windows function call to set a desired display element as a top window on a display screen of said laptop computer when movement of said gps receiver is detected.

19. A method, comprising the steps of:
(1) providing data from a gps receiver to an electronic device;
(2) monitoring said data to detect movement of said gps receiver, and determining the speed of said movement; and
(3) disabling a display feature of said electronic device when movement of said gps receiver is detected and the determined speed exceeds a predetermined value.

20. The method of claim 19, wherein:
step (1) comprises, providing data from said gps receiver to said electronic device, said data comprising first data in a speed data field; and
step (3) comprises, disabling said display feature of said electronic device when said first data in said speed data field indicates movement at a speed that exceeds the predetermined value.

21. The method of claim 20, wherein said predetermined value is less than or equal to approximately 1 knot.

22. The method of claim 20, wherein said predetermined value is less than or equal to approximately 0.5 knots.

23. The method of claim 19, wherein step (3) comprises obscuring data on a display screen of said electronic device when movement of said gps receiver is detected.

24. The method of claim 19, wherein step (3) comprises setting a desired display element as a top window on a display screen of said electronic device when movement of said gps receiver is detected.

25. The method of claim 19, wherein step (3) comprises executing a windows function call to set a desired display element as a top window on a display screen of said electronic device when movement of said gps receiver is detected.

26. The method of claim 19, wherein:
step (1) comprises providing first data in a first data field from said gps receiver to said electronic device; and
step (2) comprises monitoring said first data in said first data field to detect movement of said gps receiver; and
further comprising the steps of:
(4) partially disabling said gps receiver so that said gps receiver does not provide second data in a second data field to said electronic device; and
(5) detecting whether said gps receiver provides said second data to said electronic device; and wherein step (3) comprises disabling said display feature of said electronic device when movement of said gps receiver is detected only if it is also detected that said gps receiver does not provide said second data to said electronic device.

27. The method of claim 19, further comprising:
after step (3), temporarily enabling said display feature of said electronic device for a first selected period of time upon receipt of a temporary enabling command.

28. The method of claim 19, further comprising:
after step (3), monitoring said data to detect cessation of movement of said gps receiver; and enabling said display feature of said electronic device after a second selected period of time passes from when cessation of movement of said gps receiver is detected.

29. The method of claim 19, further comprising;
after step (3), monitoring said data to detect cessation of movement of said gps receiver; and enabling said display feature of said electronic device after the sooner of (a) a second selected period of time passes from when cessation of movement of said gps receiver is detected, or (b) cessation of movement of said gps receiver is detected and an enabling command is received.

30. The method of claim 25, wherein the desired display element is a moving graphic element.

31. The method of claim 25, wherein the desired display element emulates a blank screen.

32. The method of claim 31, wherein the blank screen is comprised of a color other then black.

33. The method of claim 25, wherein the desired display element emulates a screen saver.

34. A method, comprising the steps of:
(1) providing a first data in a first data field from a gps receiver to an electronic device;
(2) monitoring said first data in said first data field to detect movement of said gps receiver;
(3) partially disabling said gps receiver so that said gps receiver does not provide a second data in a second data field to said electronic device; and
(4) disabling a feature of said electronic device when said gps receiver does not provide said second data in said second data field to said electronic device.

35. The method of claim 34, wherein step (4) comprises obscuring data on a display screen of said electronic device when said gps receiver does not provide said second data in said second data field to said electronic device.

36. The method of claim 34, wherein step (4) comprises setting a desired display element as a top window on a display screen of said electronic device when said gps receiver does not provide said second data in said second data field to said electronic device.

37. The method of claim 34, wherein step (4) comprises executing a windows function call to set a desired display element as a top window on a display screen of said electronic device when said gps receiver does not provide said second data in said second data field to said electronic device.

38. The method of claim 34, further comprising:
after step (4), temporarily enabling said feature of said electronic device for a first selected period of time upon receipt of a temporary enabling command.

39. The method of claim 34, further comprising:
after step (4), monitoring said first data in said first data field to detect cessation of movement of said gps receiver; and enabling said gps receiver upon detecting cessation of movement of said gps receiver so that said gps receiver can provide said second data in said second data field to said electronic device; and enabling said feature of said electronic device after said second data in said second data field is detected by said electronic device.

40. The method of claim 34, wherein:
step (1) comprises providing a first data in a first data field, said first data field comprising a speed data field; and
step (4) comprises partially disabling said feature of said electronic device when said gps receiver does not provide said second data in said second data field to said electronic device, wherein said gps receiver does not provide said second data in said second data field when said first data in said speed data field indicates movement of said gps receiver at a speed that exceeds a predetermined value.

41. A method, comprising the steps of:
(1) providing, in a mobile environment, an electronic device with a display screen and a gps receiver;
(2) providing data from said gps receiver to said electronic device, said data comprising speed data in a speed data field;
(3) monitoring said data to detect a movement of said gps receiver; and
(4) disabling a feature of said electronic device when said data indicates said movement of said gps receiver meets a pre-defined criteria of said movement for disabling said feature and altering said display screen of said electronic device.

42. The method of claim 41, wherein step (4) comprises disabling a feature of said electronic device when said data indicates said movement of said gps receiver meets a pre-defined criteria of said movement for disabling said feature, said pre-defined criteria comprising said speed data in said speed data field indicating said movement of said gps receiver at a speed exceeding a predetermined value.

43. The method of claim 41, wherein step (4) comprises disabling a feature of said electronic device when said data indicates said movement of said gps receiver meets a pre-defined criteria of said movement for disabling said feature, said pre-defined criteria comprising said speed data in said speed data field indicating said movement of said gps receiver at an acceleration change exceeding a predetermined value.

* * * * *

UNITED STATES PATENT AND TRADEMARK OFFICE
CERTIFICATE OF CORRECTION

PATENT NO. : 7,640,101 B2 Page 1 of 1
APPLICATION NO. : 10/875918
DATED : December 29, 2009
INVENTOR(S) : Pair et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1588 days.

Signed and Sealed this

Ninth Day of November, 2010

David J. Kappos
*Director of the United States Patent and Trademark Office*